A. A. PEATT.

Thill-Coupling.

No. 35,170.  Patented May 6, 1862

Witnesses.
J. W. Coombs
G. W. Reid

Inventor.
A. A. Peatt,
per Munn & Co.
Attys.

UNITED STATES PATENT OFFICE.

A. A. PEATT, OF GREENFIELD, MASSACHUSETTS.

IMPROVEMENT IN SHACKLES FOR CONNECTING THILLS TO AXLES.

Specification forming part of Letters Patent No. 35,170, dated May 6, 1862.

*To all whom it may concern:*

Be it known that I, A. A. PEATT, of Greenfield, in the county of Franklin and State of Massachusetts, have invented a new and Improved Shackle for Connecting Thills to Axles; and I do hereby declare that the following is a full, clear, and exact description of the same, reference being had to the accompanying drawings, making a part of this specification, in which—

Figure 1:
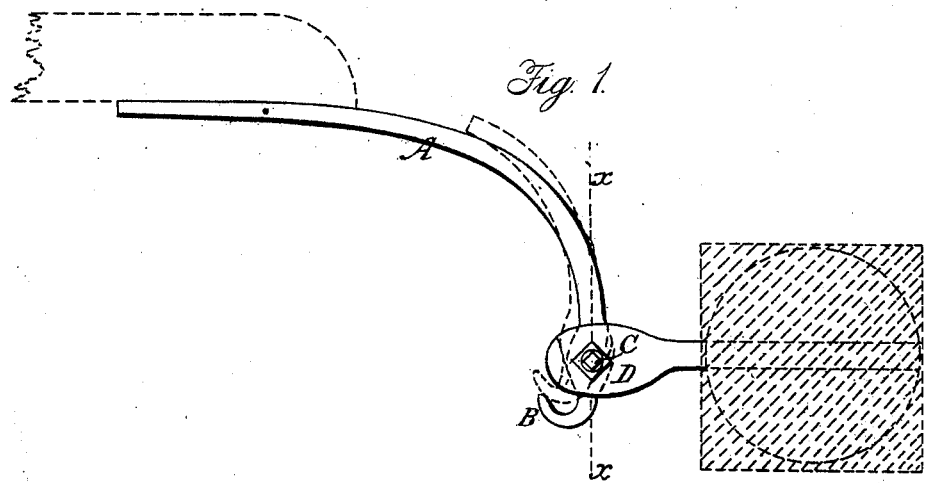
Figure 2:
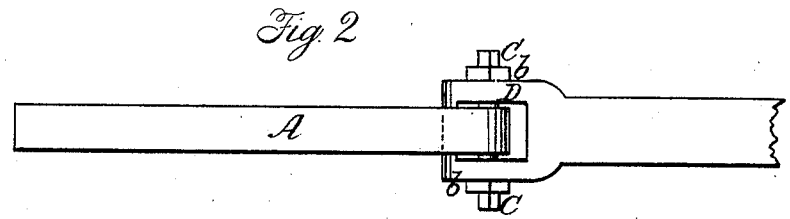
Figure 3:
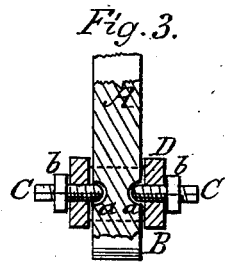

Figure 1 is a side view of my invention; Fig. 2, a plan or top view of the same; Fig. 3, a section of the same, taken in the line $x\,x$, Fig. 1.

Similar letters of reference indicate corresponding parts in the several figures.

The object of this invention is to obtain a shackle or thill-coupling which will be simple in construction, form a strong and durable connection, and in case of breakage possess in itself a means to form a temporary connection to prevent the detachment of the thills from the axle, so as to avoid the application or use of the ordinary "safety-straps" now employed to prevent the thills, in case of such a contingency, coming in contact with the heels of the horse and frightening the same.

The invention consists in having the back ends of the irons of the thills bent in hook form, fitted in eyes which are attached to the axle, and secured therein by center bolts and nuts or an equivalent means, as hereinafter fully shown and described.

To enable those skilled in the art to fully understand and construct my invention, I will proceed to describe it.

A represents the iron of a thill, which is of curved form and secured to the back end of the thill by bolts, as usual. The lower end of this iron is bent in the form of a hook, as shown at B in Fig. 1, and the portion of the iron just above the hook is enlarged, as shown by the dotted lines in Fig. 1. In each side of this enlarged portion of the iron A there is made a conical recess, $a$, as shown in Fig. 3, to receive the conical or pointed ends of two screws or bolts, C C, which pass laterally through the sides of an eye, D, attached to the axle.

The hook B of the iron is below the eye D, as shown in Fig. 1, and the bolts C are firmly secured in the eye by means of nuts $b\,b$, which are screwed up against the outer sides of the eye, as shown clearly in Fig. 3.

The bolts C C, it will be seen, secure the iron A in the eye D and at the same time admit of the iron playing or working on the bolts under the motion of the thills. In case of wear the bolts C C may be screwed up, so as to effectually prevent any rattling of the iron in the eye. If either or both of the bolts should give way or break, the hook B will catch on the front part of the eye, as shown in red in Fig. 1, and prevent the thill being detached from the axle. Thus the safety-straps are avoided. The device is extremely simple and may be constructed at a small cost.

Having thus described my invention, what I claim as new, and desire to secure by Letters Patent, is—

The iron A, provided with the hook B, in connection with the eye D and the bolts C C or their equivalent, substantially as and for the purpose herein set forth.

A. A. PEATT.

Witnesses:
    JAMES S. GRENNELL,
    Q. A. SEWARD.